US006582794B1

(12) United States Patent
Fransen

(10) Patent No.: US 6,582,794 B1
(45) Date of Patent: Jun. 24, 2003

(54) ARCHITECTURAL COVERING

(75) Inventor: Anton Petrus Theodorus Hubertus Fransen, Vlierden (NL)

(73) Assignee: Hunter Douglas Industries B.V., Rotterdam (NL)

( * ) Notice: Subject to any disclaimer, the term of this patent is extended or adjusted under 35 U.S.C. 154(b) by 81 days.

(21) Appl. No.: 09/676,069

(22) Filed: Sep. 29, 2000

(65) Prior Publication Data

(65)

(30) Foreign Application Priority Data

Oct. 1, 1999 (EP) .......................................... 99203208
Jul. 4, 2000 (EP) .......................................... 00202325

(51) Int. Cl.[7] .............................................. B32B 3/06
(52) U.S. Cl. ...................... 428/101; 428/223; 442/239; 442/318; 442/381
(58) Field of Search ............................... 428/101, 223; 442/327, 239, 318, 381

(56) References Cited

U.S. PATENT DOCUMENTS

| | | | |
|---|---|---|---|
| 2,029,675 A | | 2/1936 | Schlamp |
| 2,502,101 A | | 3/1950 | Morgan et al. |
| 2,549,167 A | | 4/1951 | Brubaker |
| 3,359,610 A | | 12/1967 | Faircloth |
| 3,943,980 A | | 3/1976 | Rheaume |
| 4,025,684 A | | 5/1977 | Neidhardt |
| 5,400,848 A | | 3/1995 | Gainer |
| 5,454,414 A | * | 10/1995 | Colson et al. |
| 5,785,094 A | | 7/1998 | Yoshida |
| 5,791,392 A | | 8/1998 | Fernandez Lopez |

FOREIGN PATENT DOCUMENTS

| | | | |
|---|---|---|---|
| DE | 23 26 438 | | 2/1975 |
| DE | 44 19410 | | 12/1995 |
| FR | 1.366.224 | | 6/1964 |
| FR | 2.063.535 | | 6/1971 |
| GB | 395176 | | 7/1933 |
| GB | 540059 | | 10/1941 |
| GB | 926663 | | 5/1963 |
| GB | 1 227 619 | | 4/1971 |
| GB | 2 058 161 | | 4/1981 |
| GB | 2162048 | * | 1/1986 |
| NL | 35856 | | 6/1935 |
| NL | 272858 | | 8/1964 |

* cited by examiner

*Primary Examiner*—Elizabeth M. Cole
(74) *Attorney, Agent, or Firm*—Dorsey & Whitney LLP

(57) ABSTRACT

A covering for an architectural opening, having a first layer with alternating relatively opaque stripes and relatively translucent stripes, and a second layer with alternation relatively opaque stripes and relatively translucent stripes. The first and second layers are positioned one behind the other, with the stripes substantially parallel. The first and second layers are movable relative to one another in a direction substantially perpendicular to the stripes. The covering also includes a series of parallel binder threads for attaching the first layer to the second layer. The binder threads run substantially perpendicular to the stripes, and thereby, one of the layers can be slid along the binder threads when moved relative to the other. The blind is preferred to be woven as a double-layer fabric.

21 Claims, 9 Drawing Sheets

ARCHITECTURAL COVERING

The invention relates to an architectural covering, particularly a covering for an architectural opening such as a window blind, having two parallel interconnected fabric layers which contain complementary patterns and can be moved relative to one another in a direction parallel to the layers. This invention particularly relates to an architectural covering having one or more parallel binder threads which connect the fabric layers and along which one of the layers can be moved relative to the other layer. This invention quite particularly relates to an architectural covering having fabric layers which contain alternating relatively translucent and relatively opaque portions and can be moved relative to one another between positions where: i) the translucent portions of the different layers coincide and ii) the opaque portions of the different layers substantially overlap, preferably completely overlap, the translucent portions of the different layers.

Blinds for covering architectural openings are known which can be opened and closed while still covering the openings. For instance, traditional venetian blinds have slats which can be tilted so as to block light or let light through from windows covered by the blinds.

Another type of such blind has two vertical layers, disposed one in front of the other and each with an array of horizontally-oriented, alternating transparent and opaque stripes. When the transparent stripes of one layer are in horizontal alignment with the transparent stripes of the other layer, light is transmitted through the blind, but when the opaque stripes of one layer are horizontally aligned with the transparent stripes of the other layer, light can be blocked by this blind. See GB 926 663, GB 1 227 619, U.S. Pat. Nos. 2,029,675, 2,549,167, FR 1 366 224 and DE 2 326 438. The two layers of fabric or plastic in such a blind are connected on their top and/or bottom ends by top and/or bottom bars. This generally results in the layers being separated by the diameter of the bars used, which makes the blind appear bulky. Also the distance, separating the two layers, does not allow the blind to completely block light from passing through it. In this regard, light shining in from a window at an acute angle can pass through the transparent stripes of the adjacent layer of the blind and then between the vertically adjacent, opaque stripes of its layers, in the horizontal gap between the layers. The bigger the horizontal gap between the layers, the more light can pass through, even if the blind is closed. Moreover since the layers in such a blind are connected only at their top and/or bottom, precisely aligning their transparent and opaque stripes to completely close the blind is not possible.

Two-layer woven fabrics are also known which are interconnected by binder threads, so that they have a special appearance and resistance to wear and tear. See, for example, U.S. Pat. No. 2,502,101, FR 2 083535, GB 2 058 161, U.S. Pat. No. 4,025,684, GB 395 176, U.S. Pat. No. 3,359,610, GB 540 059, NL 35 858, NL 272 858 and U.S. Pat. No. 3,943,980. However, the two layers of such a fabric cannot slide along the binder threads or move relative to one other.

In accordance with this invention, an architectural covering, particularly a covering for an architectural opening such as a window blind, is provided, comprising:

first fabric layer; and a second fabric layer that is parallel and adjacent to the first layer and substantially coincident with the first layer;

the second layer being capable of movement relative to the first layer in a direction parallel to the first layer; and a binder thread, between the layers, which connects them and extends in the direction of movement of the second layer; the second layer being slidable along the binder thread during the movement of the second layer relative to the first layer;

the first and second layers having complementary patterns.

By this invention, the two layers of the covering can be kept close together at all times, even when the second layer is moved relative to the first layer along the binder thread between positions where the patterns of the layers either complement each other or do not complement each other. In this regard, the covering need not have any significant gap between its two layers and need not be bulky but rather can have almost the appearance of a single layer of material.

Advantageously, the covering has a plurality of parallel binder threads, particularly where each binder thread connects the layers in a repeating pattern.

In this regard, it is especially advantageous that the complementary pattern of each layer of the covering comprises opaque portions and translucent portions, whereby the two layers can be moved relative to one another between positions where: i) the opaque portions of the pattern on each layer coincide substantially, preferably completely, with the translucent portions of the pattern on the other layer to reduce substantially the passage of light through the covering, particularly its translucent portions, and ii) the opaque portions of the pattern on each layer coincide with each other and the translucent portions of the pattern on each layer coincide with each other to allow the passage of light through the translucent portions of the covering. It is particularly advantageous that each pattern comprises alternating parallel opaque stripes and translucent stripes, quite particularly rectangular stripes; the binder thread extends substantially perpendicularly to the stripes; and the second layer is capable of movement relative to the first layer in a direction substantially perpendicular to the stripes to move the stripes between positions where: i) the opaque stripes coincide at least substantially with the translucent stripes and ii) the opaque stripes coincide with each other and the translucent stripes coincide with each other. Since there is no significant gap between the layers, the opaque stripes of this covering, when moved to be aligned substantially with the translucent stripes of the covering, can prevent much of the light from passing through the translucent stripes, for example, from a window.

In this regard, it is also particularly advantageous that each binder thread passes through opaque portions of alternately the first layer and the second layer to connect the layers while also extending in a generally straight line, especially where each binder thread forms a single binder thread loop in the opaque portions of at least the second layer, through which portions the binder thread passes, so that the opaque portions of the second layer can slide easily, relative to the translucent portions of the first layer, along the binder thread when the second layer is moved relative to the first layer.

In this regard, it is quite particularly advantageous that each opaque portion is formed by warp and weft threads and each translucent portion is formed by weft threads, without warp threads. This is especially so where each binder thread is a weft thread which forms a binder thread loop, preferably a plurality of binder thread loops, each of which passes about, preferably closely about, a warp thread of each opaque portion, to which the binder thread is connected. This is particularly advantageous where each binder thread loop of each binder thread is off-center, in the direction of the binder thread, on the opaque portion, to which the binder thread is connected.

It is also advantageous that a layer, preferably a rear layer, has a weft thread, preferably a plurality of weft threads, each forming a weft thread loop, preferably a plurality of weft thread loops; each weft thread loop spanning a warp thread, about which a binder thread loop passes, and preferably also spanning warp threads on either side of said warp thread; each weft thread loop being adjacent to said binder thread loop.

It is further advantageous that the layers of the covering are woven together with the binder thread.

Also in accordance with this invention, an architectural covering, particularly a covering for an architectural opening such as a window blind, is provided comprising;

a first fabric layer; and a pulling thread which passes through the first layer to form, along the pulling thread, spaced apart, pulling thread loops about, threads of the first layer; an end of the pulling thread being located at a side of the first layer; and the first layer being slidable along the pulling thread, toward the end of the pulling thread when the end of the pulling thread is pulled toward an opposite end of the pulling thread with the side of the first layer.

Advantageously, the first layer is woven together with the pulling thread. Also advantageously, this covering comprises a plurality of the pulling threads which are parallel and are preferably woven into the rear of a rear layer of the covering. Further advantageously, this covering comprises the first and second layers and the binder thread, described above.

It is also advantageous that a layer, preferably a rear layer, has a weft thread, preferably a plurality of weft threads, each forming a weft thread loop, preferably a plurality of weft thread loops; each weft thread loop spanning a warp thread, about which a pulling thread loop passes, and preferably also spanning warp threads on either side of said warp thread; each weft thread loop being adjacent to said pulling thread loop.

It is further advantageous that each binder thread and any pulling thread in the coverings, described above, is made of a polyester, nylon, aramid, or polytetrafluoroethylene, particularly a heat-resistant material.

It is yet further advantageous that each binder thread and any pulling thread in the coverings, described above, is a preshrunk and smooth thread, especially where the layers of the covering are not preshrunk, particularly where the covering is eventually subjected to heat shrinkage, whereby when the covering eventually shrinks during heating, each binder thread and each pulling thread will become looser within the covering.

Additional aspects of the invention will be apparent from the detailed description below of particular embodiments and the drawings thereof, in which:

FIGS. 1(*a*) and (*b*) illustrate schematically the front and side (in cross-section taken along line b—b in FIG. 1(*a*)), respectively, of a first embodiment of a fabric window blind of the invention in its closed position; in FIG. 1(*a*), the bottom of the blind has been cut to separate the layers, and the front layer has been folded away from the rear layer.

FIGS. 1(*c*) and (*d*) illustrate schematically the front and side (in cross-section taken along line d—d in FIG. 1(*c*)), respectively, of the fabric blind of FIGS. 1(*a*) and (*b*) in its open position; in FIG. 1(*c*), the bottom of the blind has been cut to separate the layers, and the front layer has been folded away from the rear layer.

FIGS. 2(*a*) and (*b*) illustrate schematically the front of a second embodiment of a fabric window blind of the invention in its closed and open positions, respectively; the fabric of the blind has been printed with a pattern.

FIGS. 3(*a*) and (*b*) illustrate schematically a cross-section of a fabric blind, such as the blind of FIGS. 1(*a*)–(*d*), in its closed and open positions, respectively.

FIGS. 4(*a*), (*b*) and (*c*) illustrate schematically the front of a third embodiment of a fabric window blind of the invention in its closed, open and partially open positions, respectively.

Figure 1A:
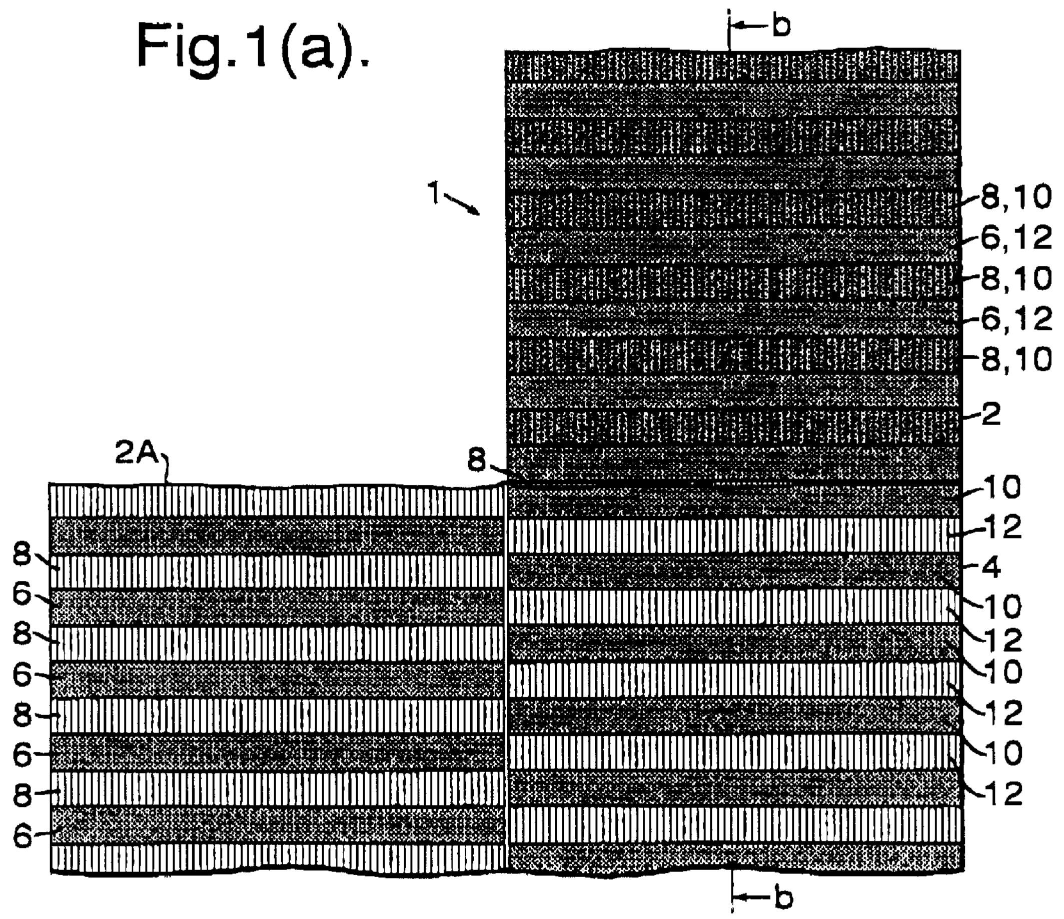
Figure 1B:
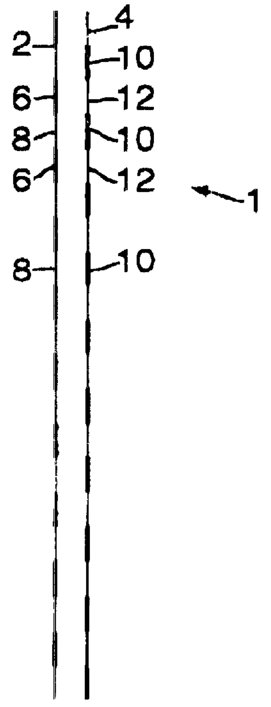
Figure 1C:
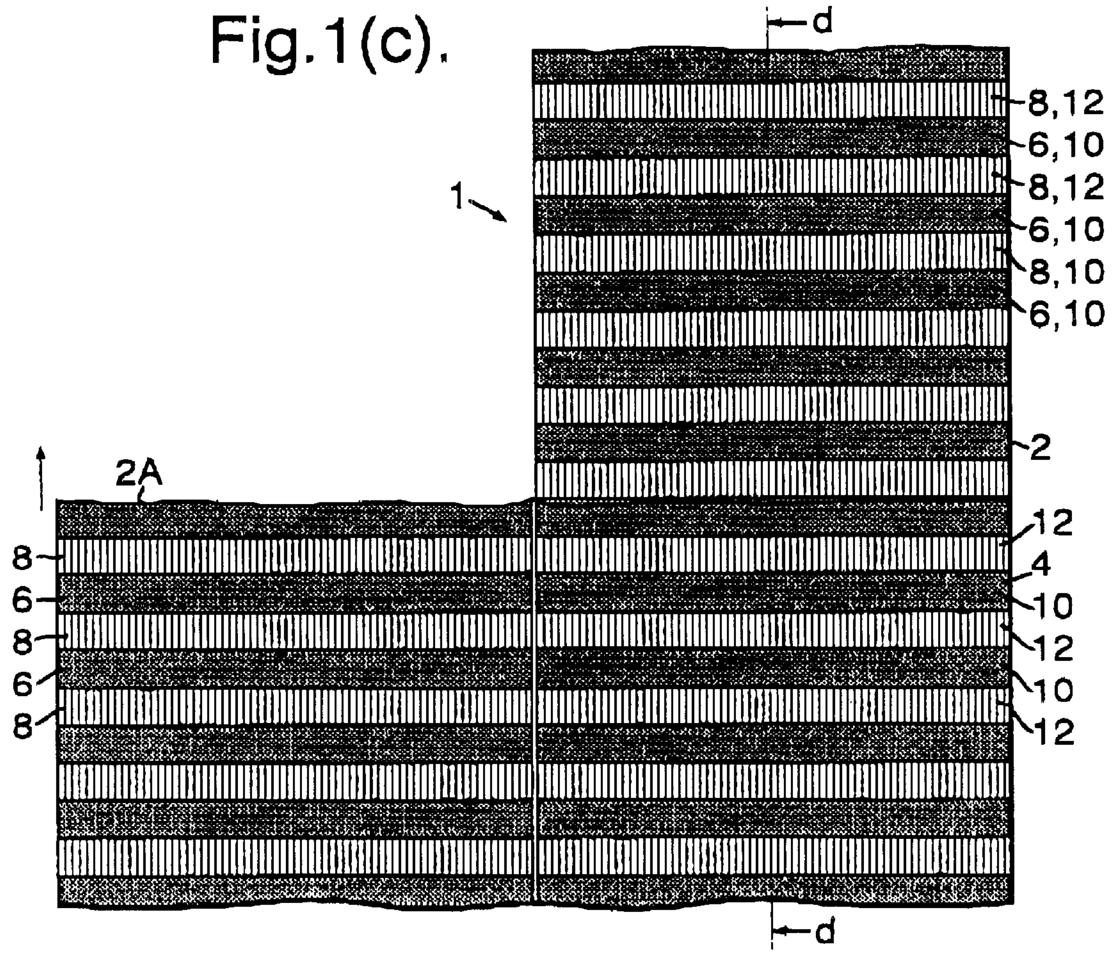
Figure 1D:
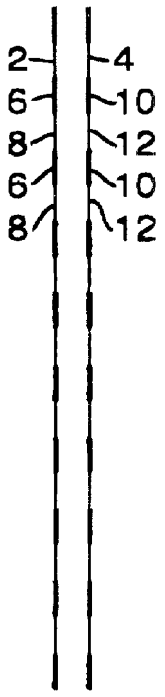

The basic principle of operation of an architectural covering of the invention will be described with reference to a fabric window blind 1 of FIGS. 1(*a*)–(*d*). The blind 1 comprises a vertically-extending front layer 2 and a vertically-extending rear layer 4 of substantially the same height and width. In FIGS. 1(*a*) and (*c*), the bottom part 2A of the front layer 2 has been cut away and folded open to the left, to expose the rear layer 4. The front layer 2 has a plurality of horizontally-extending, parallel rectangular stripes 6, 8. Relatively opaque stripes 6 alternate with relatively translucent stripes 8. The rear layer 4 also has a plurality of longitudinally-extending, parallel rectangular stripes 10,12, with relatively opaque stripes 10 alternating with relatively translucent stripes 12. As described below, the front layer 2 can be moved vertically relative to the rear layer 4, so that the opaque stripes 6,10 of the two layers can be horizontally aligned with respect to each other or with respect to the translucent stripes 8,12. Such movement of the front layer 2 can, therefore, be used to control and vary the light-transmitting properties of the blind 1.

At least one, vertically-extending binder thread 14 (shown in FIGS. 3(*a*), 3(*b*), 5 and 6 is attached to the layers 2,4. The binder thread 14 allows the front layer 2 to slide, in a controlled manner, vertically relative to the rear layer 4, along the binder thread. Preferably, the blind 1 contains a plurality of such binder threads 14 in parallel spaced-apart relationship.

As shown in FIGS. 1(*a*) and (*b*), the opaque stripes 6 of the front layer 2 are horizontally aligned with, and therefore horizontally cover, the translucent stripes 12 of the rear layer 4. As a result, the opaque stripes 10 of the rear layer 4 are horizontally aligned with, and therefore visible through, the translucent stripes 8 of the front layer 2. Thus, the opaque stripes 6,10 of the front and rear layers 2,4 appear alternately along the vertical length of the blind 1 and, the blind 1 is effectively closed and can block out light from a window behind the blind.

By sliding one of the layers 2,4 vertically from its position in FIGS. 1(*a*) and (*b*), relative to the other layer 4,2, the blind 1 can be opened as shown in FIGS. 1(*c*) and (*d*). In this regard, the front layer 2 can be moved upwardly relative to the rear layer 4 in the direction of arrow A, so that the opaque stripes 6 of the front layer are horizontally aligned with the opaque stripes 10 of the rear layer and the translucent stripes 8 of the front layer are horizontally aligned with the translucent stripes 12 of the rear layer. Thereby, the blind 1 can let light, from a window behind the blind, through the horizontally-aligned translucent stripes 8, 12.

In the blind 1 of FIGS. 1(a)–(d), the opaque stripes 6 of the front layer 2 are of the same vertical width or height as the opaque stripes 10 of the rear layer 4 and as the translucent stripes 8,12 of the front and rear layers. This allows the blind 1 to be opened a maximum amount, i.e., ½ of the height of the blind. However, where the blind 1 is not to be opened as much as possible, the front layer 2 can be moved upwardly a smaller distance relative to the rear layer 4. Then, the opaque stripes 6,10 of the front and rear layers 2,4 will partially overlap horizontally the translucent stripes 8,12 of the front and rear layers, and the blind 1 will be only partially open.

In the woven two-layer fabric blind 1, the height of each opaque stripe 8,10 is equal and corresponds to the height of a translucent stripe 8,12. This is achieved by splitting the warp threads [which extend horizontally in the blind 1 of FIGS. 1(a)–(d)] into separate groups for the front and rear layers 2,4 as described below with reference to FIGS. 5 and 8. However, if desired, the opaque stripes 6,10 could also be made with heights that are different from those of the translucent stripes 8,12, or the stripes 6,8 of the front layer 2 could have heights that are equal but different from the heights of the stripes 10,12 of the rear layer 4. Besides creating an aesthetically pleasing pattern, such variations in the heights of the stripes would not increase or decrease the maximum opening of the blind.

Figure 4A:
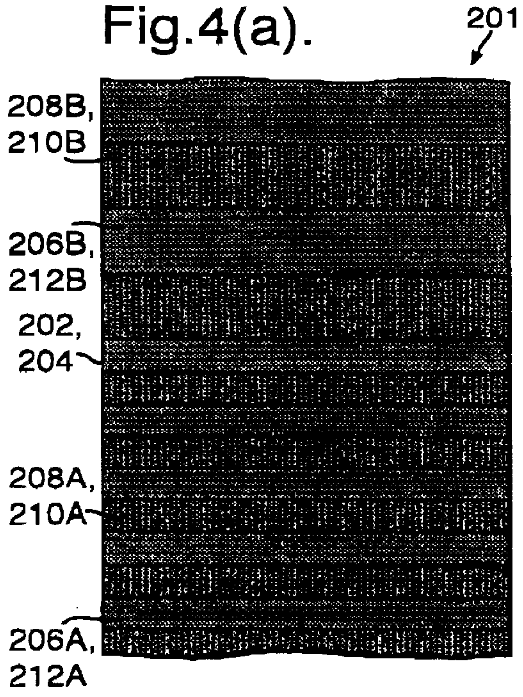
Figure 4B:
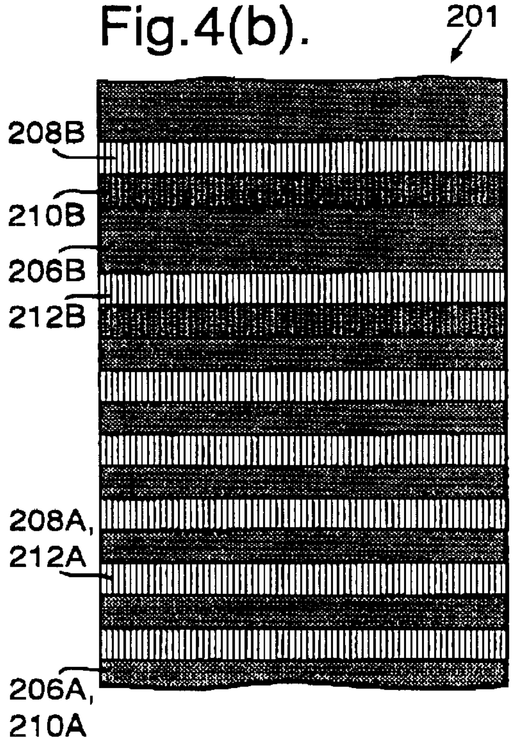
Figure 4C:
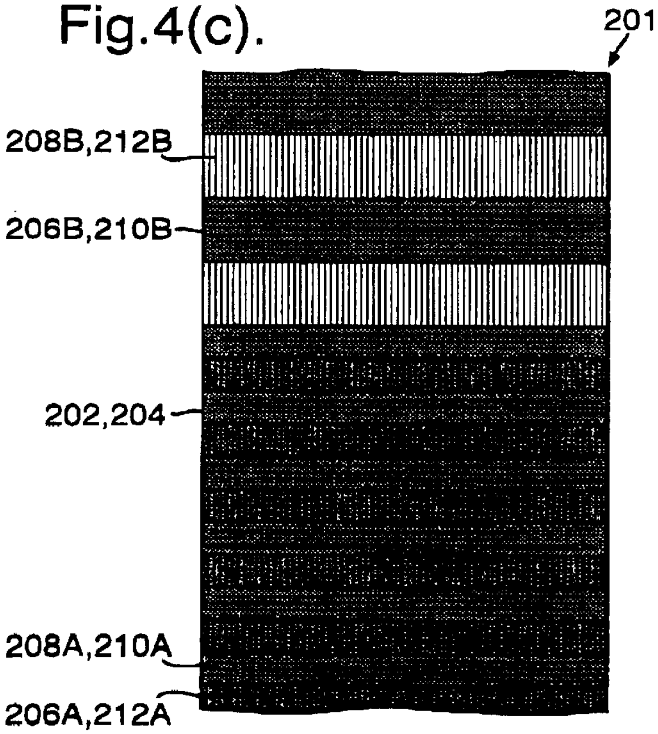

Using the weaving techniques of FIGS. 5 and 6, described below, a two-layer fabric can also be woven having, along its height, stripes of increasing height or of different heights. For example, FIGS. 4(a)–(c) show a blind 201 that has narrow stripes 206A,208A,210A,212A at the bottom and broad stripes 206B,208B,210B, 212B at the top, so that a top part of the blind 201 can be opened while its bottom part remains closed. This allows sunlight to enter a room towards its ceiling while at the same time blocking out sunlight that might hinder the viewing of, for example, a television or computer monitor in the room. In this regard, the bottom part of the fabric blind 201 can be provided with opaque and translucent stripes 206A,208A,210A,212A, each having a height that is no more than half of the height of the opaque and translucent stripes 206B, 208B, 210B, 212B of the top part of the blind.

Other variations in stripe heights are possible when the blind 1 is made from layers 2,4 that are: separately made, for example separately woven or otherwise produced separately, e.g., of a non-woven material; and subsequently interconnected by one or more binder threads 14 (shown in FIGS. 5 and 6). In this regard, the heights of the stripes of the front layer 2 can be different from those of the rear layer 4. Thereby, various decorative effects can be achieved. For instance, the rear layer 4 could be provided with two alternately arranged patterns or colors, such that by moving the front and rear layers relative to one another, the different patterns or colors can be exposed selectively. Furthermore, the blind 1 could have more than two layers 2,4. For instance, by providing three layers, each having opaque stripes of half the height of the translucent stripes, the opening ratio can be increased to ⅔. This is also possible when the blind is completely woven, but when a non-woven fabric is used as one or all the layers, the different stripes can be painted on the layers or the layers can have different stripes made of different materials.

Preferably, the front and rear layers 2,4 of the fabric blind 1 are woven simultaneously with their attachment to the binder threads 14. See FIGS. 5, 6(a) and (b), described below. This facilitates production of the fabric of the blind 1 since the two layers 2,4 need not be subsequently bound together. It is also possible to weave the front and/or rear layers 2 4, themselves, as two or more layers simultaneously with their attachment to the binder threads 14. This ensures correct registration between the multiple layers of the front and rear layers 2,4 and between such layers and the binder threads 14 during subsequent treatments of the fabric blind 1, such as stiffening, water-proofing, printing and the like. However, the blind 1 can also be made of separately produced, woven or non-woven, front and rear layers 2,4, each of one or more layers which are subsequently interconnected with binder threads 14.

The binder threads 14 (shown in FIGS. 3(a), 3(b), 5 and 6) hold the front and rear layers 2,4 of the blind 1 horizontally together and accurately guide the two layers' relative vertical movement. The pattern of connecting each binder thread 14 to the two layers 2,4 determines the maximum possible movement of the layers relative to each other. Each binder thread 14 is preferably connected to all the opaque stripes 6,10 of the layers and preferably not connected to their translucent stripes 8,12. However, not all opaque stripes 6,10 need be bound to the binder threads 14, and it is possible to skip one or more opaque stripes. In this way, the vertical distance, along which a layer can slide along the binder thread, can be increased. This can be of use for blinds where the height of the stripes varies along the height of the blind.

Figure 2A:
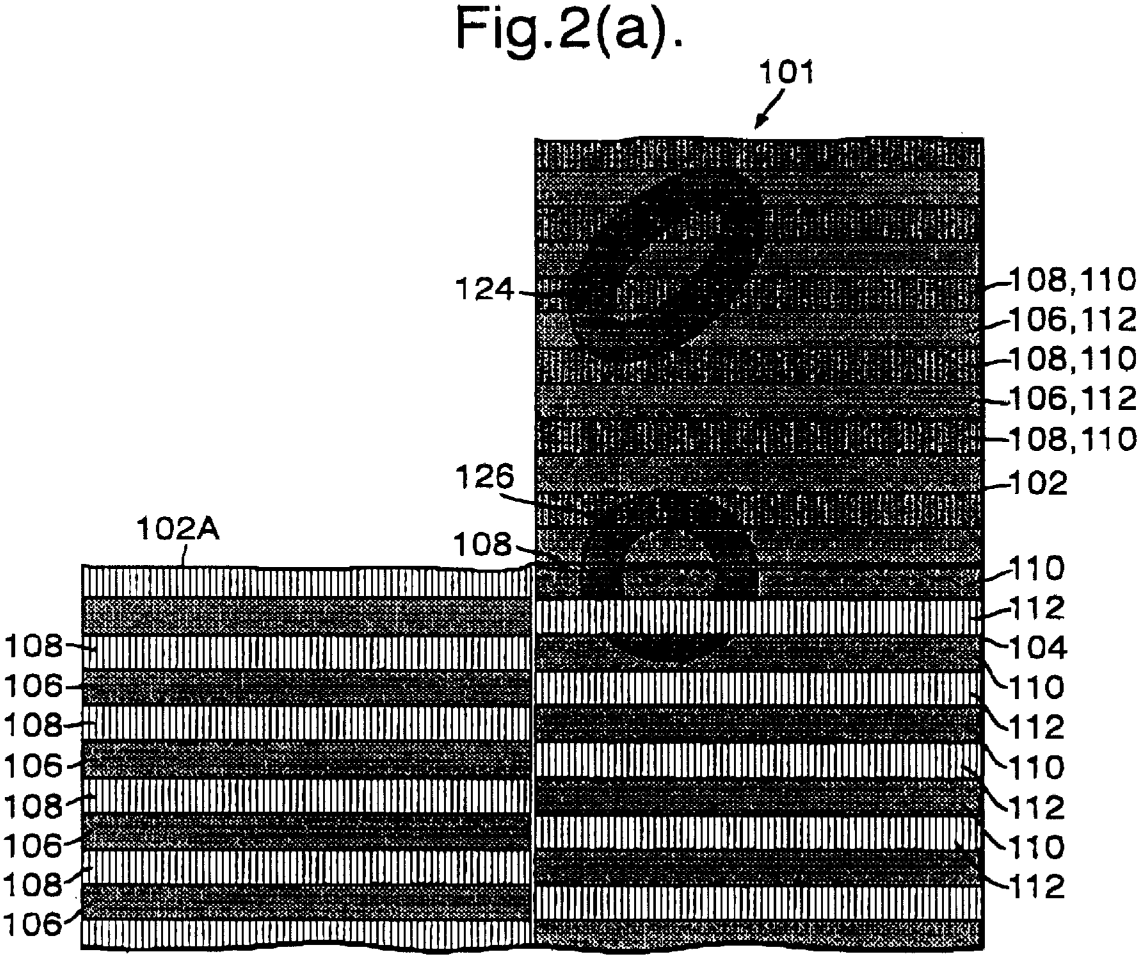
Figure 2B:
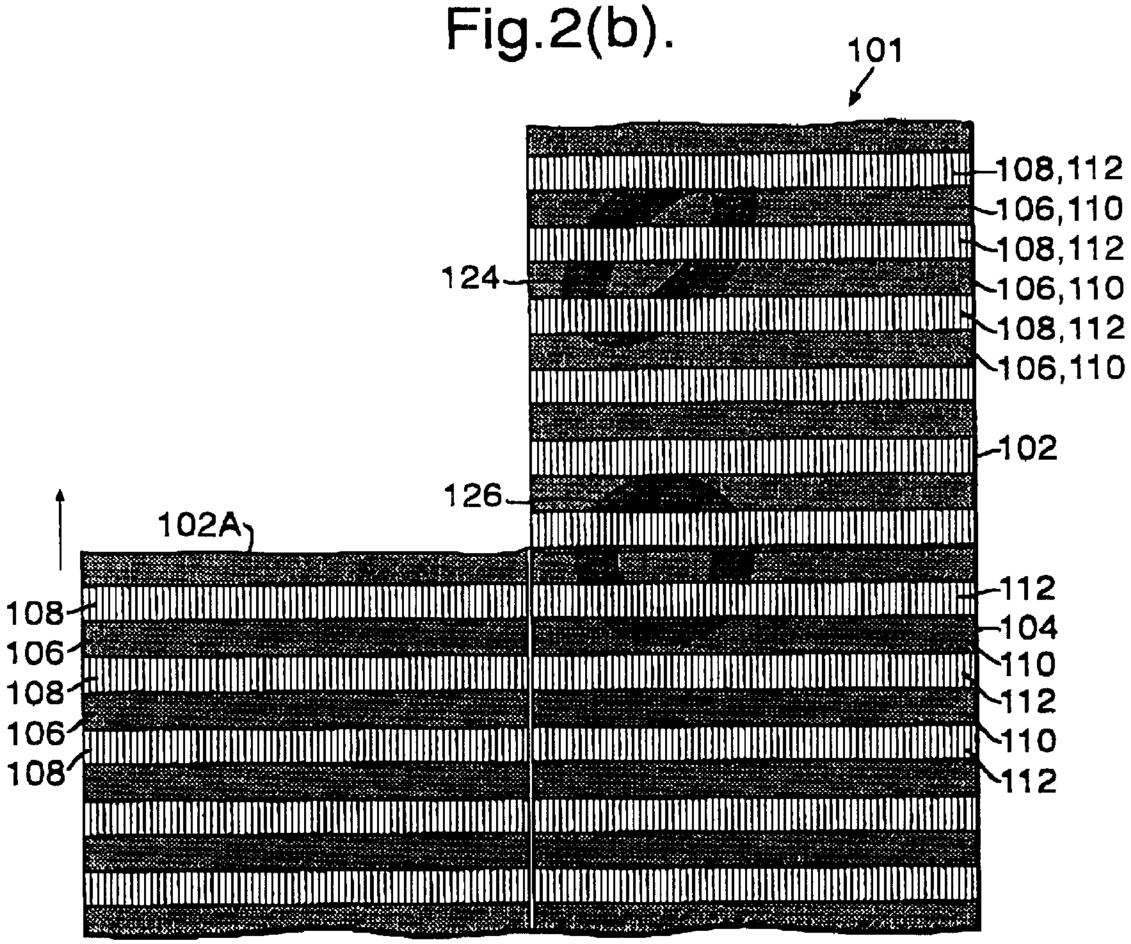

FIGS. 2(a) and (b) show a second embodiment of a fabric blind 101 which is similar to the blind 1 of FIGS. 1(a)–(d) and for which corresponding reference numerals (greater by 100) are used below for describing the same parts or corresponding parts. The relatively opaque stripes 106 of the front layer 102 of the blind 101 can be horizontally aligned with the relatively translucent stripes 112 of its rear layer 104 to close the blind as shown in FIG. 2(a) and can be horizontally aligned with the opaque stripes 110 of its rear layer 104 to open the blind as shown in FIG. 2(b). This fabric blind 101, when closed, can easily be printed on both the opaque stripes 106 and the weft threads of the translucent stripes 108 of its front layer 102, as well as on the opaque stripes 110 of its rear layer 104 (between the weft threads of the translucent stripes 108 of the front layer), by conventional transfer printing techniques. Thereby, the closed blind 101 will show the complete printed design, and the opened blind 101 will also show the complete design because its front layer 102, which is completely printed, will be visible.

FIG. 2(a) illustrates oval forms 124 and 126 printed on the front of the closed blind 101 and clearly visible on the opaque and translucent stripes 106,108 of the front layer 102 and on the opaque stripes 110 of the rear layer 104. Where the front layer 102 is shown as having been cut and folded open to the left, it is clearly seen that the oval form 128 has been printed on an opaque stripe 110 of the rear layer 104. (The folded-open portion of the top layer 102 is, of course, not shown as printed, since what is being shown is its rear side, and the print is on the other side.)

FIG. 2(b) shows the printed ovals 124,126 on the front of the open blind 101 and clearly visible on the opaque and translucent stripes 106,108 of the front layer 102.

Figure 3A:
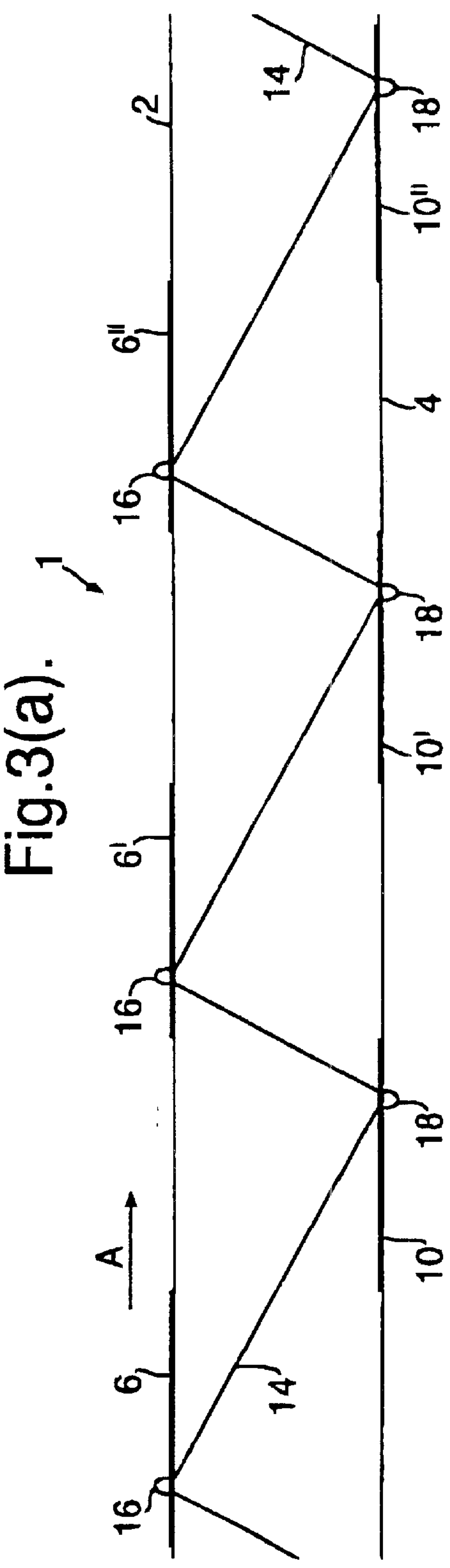
Figure 3B:
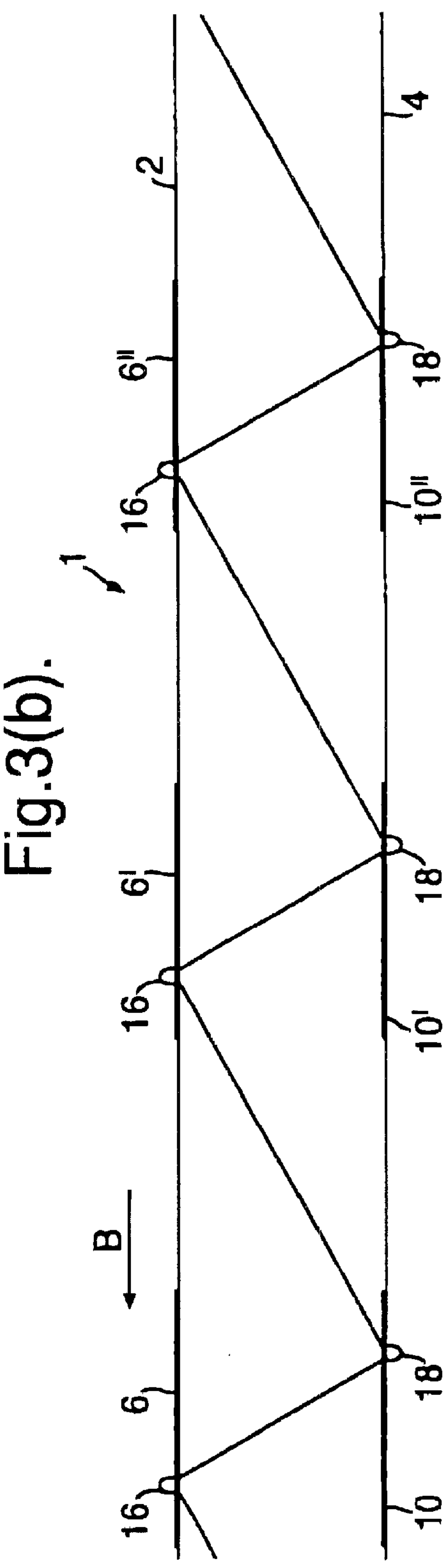

As shown in FIGS. 3(a) and (b), each binder thread 14 of the fabric blind 1 preferably extends between the front and rear layers 2,4 and is perpendicular to their stripes 6,8,10,12. Each binder thread 14 follows a zig-zag path between the layers and extends outwardly thereof through the opaque stripes 6,10. In this regard, the binder thread 14: i) extends frontally and vertically through a first opaque stripe 6' of the front layer 2; ii) passes vertically about the front of one or more warp threads of the first opaque stripe 6' to form a generally u-shaped, front binder thread loop 16; iii) extends rearwardly and vertically through the first opaque stripe 6', then between the layers and then through a second opaque stripe 10' of the rear layer 4; iv) passes vertically about the rear of one or more warp threads of the second opaque stripe 10' to form a generally u-shaped, rear binder thread loop 18; extends frontally and vertically through the second opaque stripe 10', then between the layers and then through a third opaque stripe 6" of the front layer 2; v) passes vertically about the front of one or more warp threads of the third opaque stripe 6" at another front binder thread loop 18; vi) extends rearwardly and vertically through the third opaque stripe 6", then between the layers and then through a fourth opaque stripe 10" of the rear layer 4; and so on.

In accordance with this invention, each binder thread 14 is adapted, so that one of the layers 2,4 can be smoothly slid vertically along the binder thread between the vertically adjacent binder thread loops 16,18, formed by the binder thread passing vertically about the warp threads of the opaque stripes 6,10 of the layers. In this regard, FIG. 3(*a*) shows how the front layer 2 could be moved, without hindrance, vertically (e.g., upwardly), in the direction of arrow A, along the binder thread 14, relative to the rear layer 4, to open the blind 1; and FIG. 3(*b*) shows how the front layer 2 could be moved, without hindrance, vertically (e.g., downwardly), in the direction of arrow B, along the binder thread 14, relative to the rear layer 4, to close the blind.

Also in accordance with this invention, the front and rear layers 2,4 of the blind 1, as shown in FIGS. 3(*a*) and (*b*), are horizontally very close together, and the distance between the layers does not vary as a result of opening or closing the blind. As a result, each binder thread 14 is substantially vertical and deviates only slightly from a straight vertical path in order to connect the two layers.

The path of the binder thread 14, between the two layers 2,4 of the blind 1, determines the maximum vertical movement of the layers relative to one another. Starting from the closed position of the blind 1 in FIG. 3(*a*), its front layer 2 can be moved vertically (e.g., upwardly) in the direction of arrow A, relative to its rear layer 4 which is held stationary. As the front layer 2 is so-moved, it slides along the binder thread 14 at the front binder thread loop 16. The top and bottom of the binder thread 14 are preferably held with the top and bottom of the stationary rear layer 4. This movement of the front layer 2 will continue until the front layer reaches the adjacent rear binder thread loop 18 of the rear layer 4, where further movement will be blocked by the rear layer.

In the blinds of this invention, such as the blind 1 of FIGS. 1(*a*)–(*d*) and 3(*a*) and (*b*), the maximum vertical movement of the front layer 2, relative to the rear layer 4, is determined by the distance between the front binder thread loop 16 on the front layer 2 and the adjacent rear binder thread loop 18 on the rear layer 4. In the blind 1 where all the stripes 6,8,10,12 are the same height, the distance between adjacent binder thread loops 16,18 on the front and rear layers should be the height of a single stripe, so that the layers of the blind can be moved between fully open and fully closed positions relative to one another. However in a blind such as the blind 101 of FIGS. 2(*a*) and (*b*) where the stripes 106, 108, 110,112 are of different heights, the distance between adjacent binder thread loops 116,18 on the front and rear layers 102,104 should be at least far apart enough to allow the biggest stripe to close. In this regard, the maximum vertical movement of the front layer 102, relative to the rear layer 104, can be increased if each binder thread 114 is not connected to every opaque stripe 106,110 but rather skips one or more opaque stripes when connecting the two layers 102,104. For example, every other opaque stripe 106 of the front layer 102 and every other opaque stripe 110 of the rear layer 104 can be bound by binder threads 114 at respective binder thread loops 116 and 118. In this way, the maximum movement of the front layer 102 becomes the height of two opaque stripes and one translucent stripe, and the angles of the binder threads 114 passing through the layers 102, 104 becomes less acute. Such a pattern of skips for the binder threads 114 can also diminish the friction of the front layer 104 sliding along the binder threads, which could be useful in any blind 1,101, 201 of this invention and particularly in those with stripes of small height.

As shown in FIGS. 3(*a*) and(*b*), it is preferred that the binder threads 14 not pass through the vertical centers of the opaque stripes 6, 10 of the layers 2,4 of the blind 1. Rather the binder thread loops 16,18, where each binder thread passes through the opaque stripes 6,10 of the layers, are located slightly off-center on each opaque stripe in the direction of the binder thread—i.e., off the vertical center of the height of the opaque stripes in vertically opposite directions for the two layers (e.g., below the center for the front layer 2 and above the center for the rear layer 4). This helps ensure that the opaque stripes 6,10 coincide exactly—i e., are horizontally aligned—in the open position of the blind 1.

FIGS. 4(*a*)–(*c*) show a third embodiment of a fabric blind 201 which is similar to the blind 1 of FIGS. 1(*a*)–(*d*) and for which corresponding reference numerals (greater by 200) are used below for describing the same parts or corresponding parts. In this regard, the stripes 206A, 208A, 210A,212A at the bottom of the blind 201 are vertically narrow, and the stripes 206B, 208B, 210B,212B at the top of the blind are vertically wide. The opaque stripes 206A,206B of the front layer 202 of the blind 201 can be horizontally aligned with the translucent stripes 212A,212B of its rear layer 204 to close the blind as shown in FIG. 4(*a*) and can be horizontally aligned with the opaque stripes 210A,210B of its rear layer 204 to open the blind as shown in FIG. 4(*b*). As shown in FIG. 4(*c*), the narrow opaque stripes 206A of the bottom of the front layer 202 can be aligned with the narrow translucent stripes 212A of the bottom of its rear layer 204 to close the bottom of the blind while the wide opaque stripes 206B of the top of the front layer 202 are horizontally aligned with the wide opaque stripes 210B of the top of the rear layer 204, effectively opening the top of the blind.

To provide for the correct opening of the blind 201, its binder threads 214 (not shown) have to skip at least every other opaque narrow stripe 206A at the bottom of the blind but can pass through every wide opaque stripe 206B at the top of the blind. In this regard, it is not necessary to maintain the same vertical distance between each pair of adjacent binder thread loops 216,218 (not shown) of the binder threads 214, although it is often convenient to do so. The maximum relative vertical movement of the front and rear layers 202,204 is governed by the smallest vertical distance between adjacent binder thread loops 216,218 in the blind 203, and thus for proper vertical movement of the layers of the blind 201, its adjacent binder thread loops are preferably all separated by at least the distance between the adjacent binder thread loops in its widest adjacent opaque stripes 206B,210B in the top of the front and rear layers.

Figure 5:
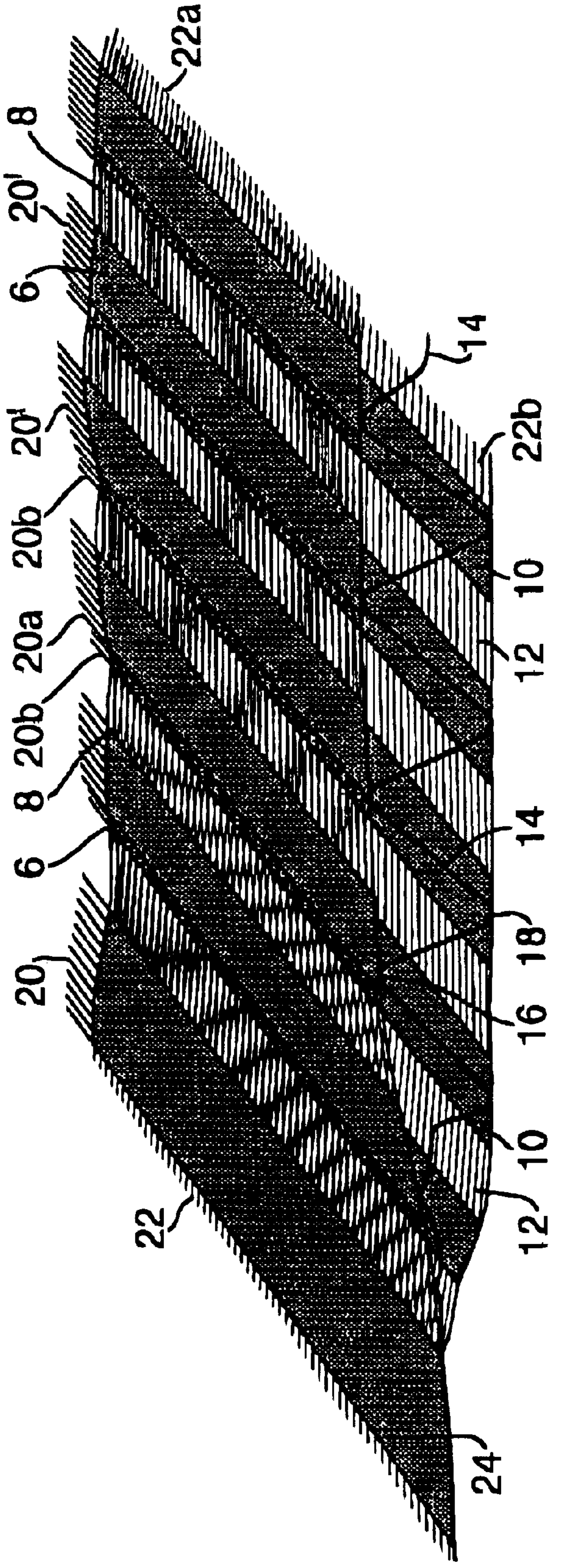
FIG. 5 illustrates schematically a perspective view of a two-layer woven fabric blind, such as the blind of FIGS. 1(*a*)–(*d*).
Figure 6A:
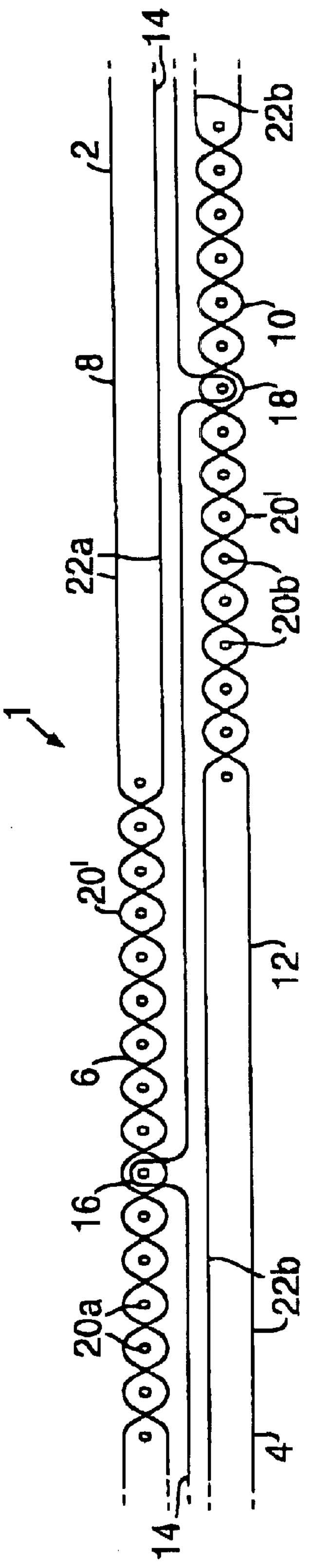
FIG. 6(*a*) illustrates schematically a process for weaving a two-layer woven fabric blind, such as the blind of FIGS. 1(*a*)–(*d*), and FIG. 6(*b*) illustrates schematically a process for weaving a multi-layer woven fabric blind, such as the blind of FIGS. 1(*a*)–(*d*).

FIG. 5 shows the striped two-layer woven fabric blind 1 of FIGS. 1(*a*)–(*d*), with its layers 2,4 pulled horizontally apart to show one of its binder threads 14 woven into its opaque stripes 6,10. FIGS. 6(*a*) and (*b*) show schematically cross-sections of two conventional processes of weaving the fabric blind 1 of FIGS. 1(*a*)–(*d*). In these processes, the opaque stripes 6,10 of the blind 1 are formed by densely woven, warp and weft threads, and its translucent stripes 8,12 are formed only by weft threads.

As shown in FIG. 5, a fabric blind 1, such as is shown in FIGS. 1(*a*)–(*d*), is woven, starting with a complete set of warp threads 20 [which extend horizontally in the blind 1 of FIGS. 1(*a*)–(*d*) and 6(*a*) and (*b*)] and a complete set of weft threads 22 [which extend vertically in the blind 1 of FIGS. 1(*a*)–(*d*)]. The set of warp threads is divided into two warp thread sub-sets 20*a* and 20*b* in different parallel planes, and the set of weft threads is divided into two weft thread sub-sets 22*a* and 22*b* in different parallel planes. Each warp thread subset 20*a*,20*b* comprises a discrete plurality 20' of parallel adjacent warp threads 20, and each discrete plurality 20' of warp threads of one warp thread sub-set 20*a* is between two discrete pluralities 20' of warp threads of the other warp thread sub-set 20*b*. Each discrete plurality 20' of warp threads of one warp thread sub-set 20*a* forms one of the opaque stripes 6 of the front layer 2 of the fabric blind 1 with one weft thread sub-set 22*a*, and each discrete plurality 20' of warp threads of the other warp thread sub-set 20*b* forms one of the opaque stripes 10 of the rear layer 4 of the blind with the other weft thread sub-set 22*b*.

The front sub-set 20*a* of warp threads 20 for the opaque stripes 6 of the front layer 2 and the rear sub-set 20*b* of warp threads 20 for the opaque stripes 10 of the rear layer 4 are woven by the respective front and rear weft thread sub-sets 22*a*,22*b* of weft threads 22. This results in two separate woven layers 2,4 with opaque strips 6,10 containing warp and weft threads 20,22 and translucent stripes 8,12, containing only weft threads 22. By weaving one or more binder threads 14 as extra weft threads 22 into the warp thread sub-sets 20*a*, 20*b* at the same time, the layers 2,4 become slidably interconnected.

A weave for a fabric blind 1,101,201 of this invention can be made more or less opaque or translucent by varying the number of warp and weft threads per square centimeter and their thickness. By varying the ratio of the number of warp and weft threads per square centimeter and/or the relative thicknesses of the warp and weft threads, a difference in appearance of the fabric can be created.

Figure 6B:
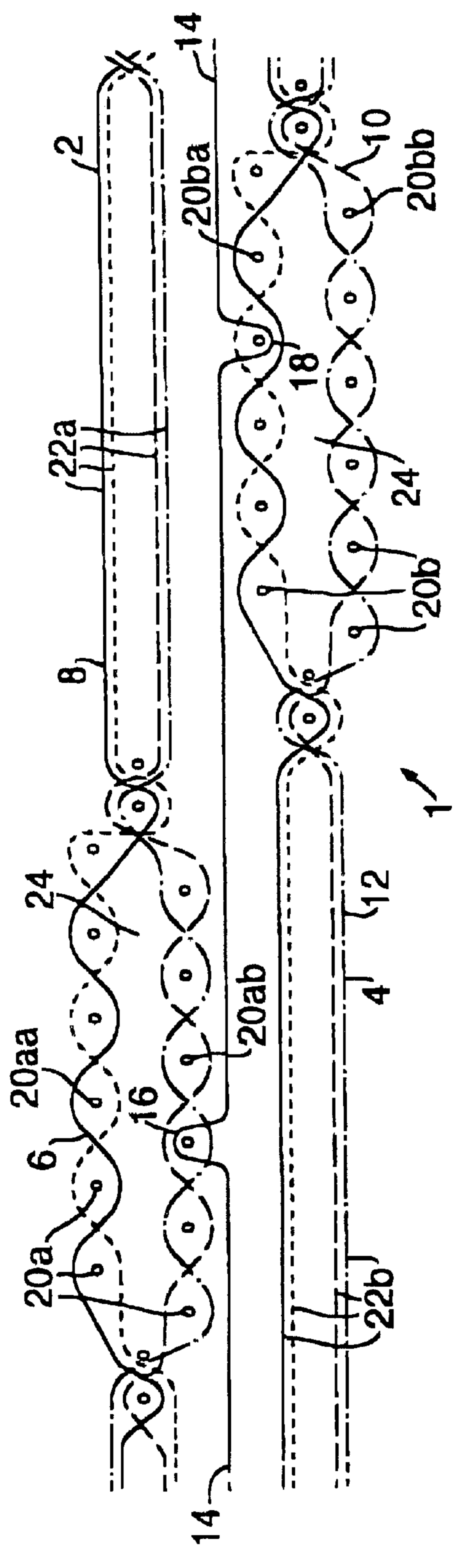

As shown in FIG. 6(*a*), dividing the warp threads 20 into front and rear sub-sets 20*a*,20*b*, with a width or height measured in the weft direction, and by weaving these warp thread sub-sets with front and rear sub-sets 22*a*, 22*b* of weft threads 22, the front and rear layers 2,4 of the fabric blind 1 can be made in a single weaving operation. In so doing, each discrete plurality 20' of adjacent warp threads of the front sub-set 20*a* is followed in the weft direction, by a space in the weft direction without warp threads and having the width or height of the horizontally adjacent, discrete plurality 20' of adjacent warp threads of the rear sub-set 20*b*. Thereby, an alternating pattern of grouped warp threads and vertical spaces without warp threads is made in each layer. When the front layer 2 is woven, each of the weft threads 22 of its front sub-set 22*a* weaves through a group of adjacent warp threads 20 of its front sub-set 20*a*, then spans a space 8 in the weft direction without warp threads, then weaves through the next group of adjacent warp threads of the front sub-set 20*a* and so on. The woven areas 6 of the front layer 2, including both warp and weft threads, are relatively dense and opaque, but the weft threads 22, spanning the spaces 8 of the front layer in the weft direction without warp threads, leave such spaces relatively open and translucent, thereby creating a striped pattern in the front layer. The rear layer 4 is woven in the same manner at the same time.

FIG. 6(*b*) shows the making of a two-layer woven fabric blind 1, corresponding to that made in FIG. 6(*a*), but with tunnels 24 extending in the warp direction in the opaque stripes 6,10. The blind of FIG. 6(*b*) can be made in the same way as the blind of FIG. 6(*a*), except: the front sub-set 20*a* of warp threads 20 is separated into front and rear portions 20*aa*, 20*ab*; and the rear sub-set 20*b* of warp threads 20 is separated into front and rear portions 20*ba*,20*bb*. The front and rear portions 20*aa*, 20*ab*, 20*ba*,20*bb* of the front and rear sub-sets 20*a*,20*b* of warp threads are then woven with the two subsets 22*a*,22*b* of weft threads 22 as described for FIG. 6(*a*).

Figure 7:
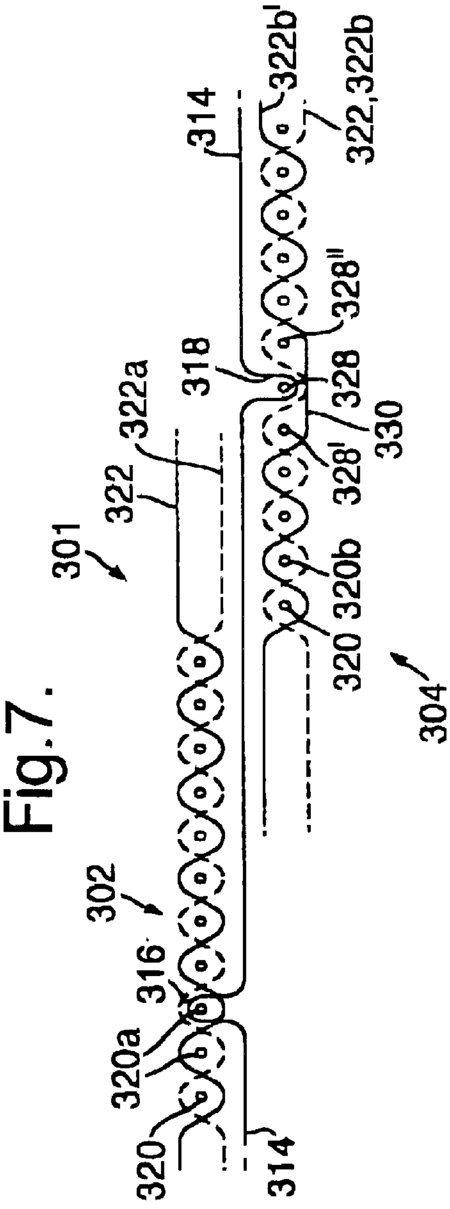
FIG. 7 illustrates schematically a cross-section of a modified two-layer woven fabric blind, such as the blind of FIGS. 1(*a*)–(*d*).

Shown in FIG. 7 is a fourth embodiment of a fabric blind 301 which is similar to the fabric blind 1 shown in FIGS. 1(*a*)–(*d*), 3(*a*)–(*b*), 5 and 6(*a*) and for which corresponding reference numerals (greater by 300) are used below for describing the same parts or corresponding parts. The blind 301 is woven, starting with a complete set of warp and weft threads 320 and 322, forming front and rear, opaque stripes (not shown) and front and rear, translucent stripes (not shown). The warp threads 320 are divided into front and rear sub-sets 320*a*, 320*b*, with a width and height measured in the weft direction, and by weaving these warp thread sub-sets with front and rear, weft thread sub-sets 322*a* and 322*b*, the front and rear layers 302, 304 are formed. One or more binder threads 314 are woven, as extra weft threads 322, into front and rear, warp thread sub-sets 322*a* and 322*b* which form the opaque stripes of the front and rear, woven layers 302, 304 of the fabric 301, in order to slidably interconnect the layers. As described below, the fabric 301 is especially adapted to have its rear layer 304 moved along its binder threads 314, relative to its front layer 302, to open and close the translucent stripes of the fabric.

In the fabric 301, as shown in FIG. 7, generally u-shaped, weft thread loops 330 are formed in the rear of the opaque stripes (not shown) of the rear layer 304 by extra weft threads 322*b*'. The weft thread loops 330 of each extra weft thread 322*b*' are adjacent to the rear binder thread loops 318 of a binder thread 314 adjacent to the extra weft thread 322*b*'. The weft thread loops 330 facilitate the slidability of the rear layer 304 along each binder thread 314 and relative to the front layer 302. Each weft thread loop 330 spans and passes vertically to the rear of: i) an adjacent warp thread 328, about the rear of which a rear binder thread loop 318 of an adjacent binder thread 314 also passes vertically; and ii) at least both warp threads 328' and 328" on either side of the adjacent warp thread 328. In FIG. 7, a single rear binder thread loop 318 of a single binder thread 314 is shown passing about a single warp thread 328, and a single weft thread loop 330 of an adjacent extra weft thread 322*b*' forms a tunnel to the rear of, and about, the three warp threads 328, 328' and 328". Thus, the extra weft thread 322*b*' in the fabric 301 has its weft thread loops 330 passing rearwardly about at least two more warp threads 328', 328" than do the rear binder thread loops 318 of its adjacent binder thread 314.

As also shown in FIG. 7, there is no corresponding weft thread loop adjacent a front binder thread loop 316 of each binder thread 314 in an opaque stripe (not shown) of the front layer 302 of the fabric blind 301. As a result, the rear layer 304 can be more easily slid along the binder threads 314 than the front layer 302. It would, of course, be possible to also provide the front layer 302 with weft thread loops adjacent to the front binder thread loops 316. However, the binder thread 314 could then too easily become displaced relative to the fabric 301 when the rear layer 304 is moved relative to the front layer 302. It is, therefore, preferable, to not provide weft thread loops in the front layer 302, so that there is a significant difference in the slidability of the layers 302,304 along the binder threads 314 between them.

Because the weft thread loops 330 of the extra weft threads 322*b*' are provided near the adjacent rear binder thread loops 318 of the adjacent binder threads 314, the rear layer 304 of the fabric blind 301 can slide, relative to the binder thread and to the front layer 302, in closer proximity to the front layer. This permits the opaque stripes (not shown) of the fabric blind 301 to more effectively prevent light from passing through its translucent stripes (not shown) when its opaque stripes are horizontally aligned with its translucent stripes in order to close the blind.

Figure 8:
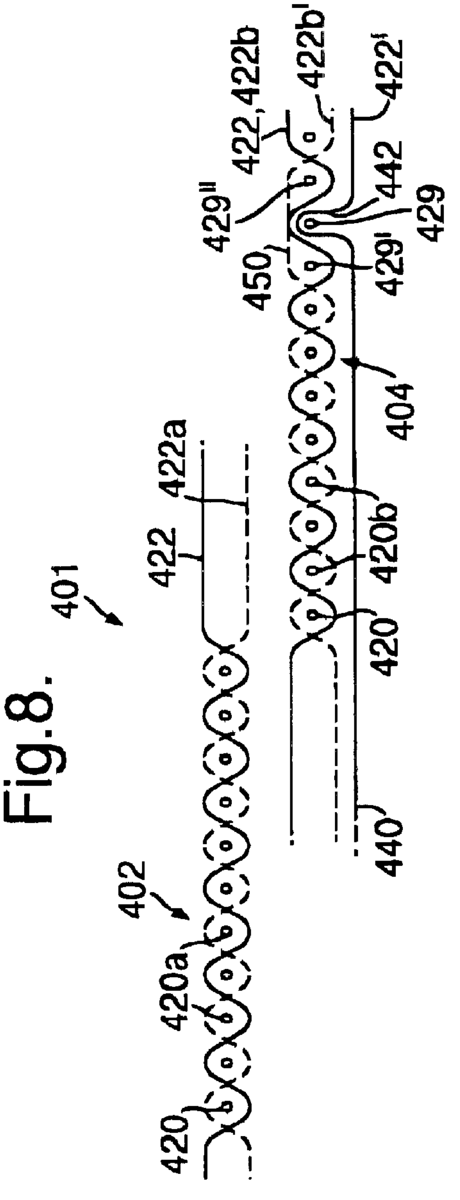
FIG. 8 illustrates schematically a cross-section of another modified two-layer woven fabric blind, such as the blind of FIGS. 1(*a*)–(*d*).

Shown in FIG. 8 is a fifth embodiment of a fabric blind 401 which is similar to the fabric blind 1 shown in FIGS. 1(*a*)–(*d*), 3(*a*)–(*b*) and 5 and for which corresponding reference numerals (greater by 400) are used below for describing the same parts or corresponding parts. The blind 401 is woven, starting with a complete set of warp and weft threads 420 and 422, forming front and rear, opaque stripes and front and rear, translucent stripes. One or more binder threads (not shown) are preferably also woven, as extra weft threads 422, into front and rear, warp thread sub-sets which form the opaque stripes of the front and rear, woven layers 402, 404 of the fabric 401, in order to slidably interconnect the layers.

In addition, at least one, pulling thread 440 is preferably woven, as an extra weft thread 422', into the rear layer 404 of the fabric 401 of FIG. 8. As shown in FIG. 8, each pulling thread 440 is at the rear of the fabric 401 and closely passes vertically about the front of warp threads 429 of the rear layer 404 at vertically spaced apart locations, thereby forming generally u-shaped, pulling thread loops 442 around such warp threads 429. Adjacent to each pulling thread loop 442 of a pulling thread 440 is a weft thread loop 450 formed by another extra weft thread 422*b*' adjacent the pulling thread. Each weft thread loop 450 passes around the front of a warp thread 429, about which is a pulling thread loop 442 and also about the front of at least both warp threads 429', 429" on either side of the warp thread 429, so as to form a tunnel (similar to those formed by the weft thread loops 330 of FIG. 7) in front of the three warp threads 429,429' and 429". As a result, a plurality of the pulling threads 440 (not shown), which are preferably in parallel spaced-apart relationship, can be used to pull up the fabric blind 401 like a Roman shade.

Depending on the weaving machine used to make the fabric blinds 1,101,201,301,401 of this invention, their front and rear layers 2,102,202, 302, 402, 4,104,204, 304,404 can be woven with their own dedicated weft threads, towed off separate spools, or with one weft thread alternately weaving front and rear layers. Since such fabric blinds are woven on a single machine, their layers and stripes can be made to be perfectly aligned. In addition, their binder threads 14,114, 214,314 can easily be woven between their layers 2,102, 202,302,402, 4,104,204,304,404 at the same time as their layers are woven. In so-doing, their binder threads can be formed by special weft threads that are interwoven with the groups of adjacent warp threads, forming the opaque stripes 6,106,206,10,110, 210 of their layers.

After weaving is completed, the resulting fabric 1,101, 201,301,401 of this invention has the opaque stripes of its front layer covering the translucent stripes of its rear layer. This closed fabric can then be suitably printed (e.g., transfer printed) on at least its front layer 2,102,302,402 in a conventional manner to create a fabric blind with the decoration shown in FIGS. 2(*a*) and (*b*). In this regard, the front layer is the layer of the fabric that is normally in view, and therefore printed, when the fabric is to be used as an architectural covering. Of course, instead of printing, transfer printing, it would be possible to produce the front layer with a single color by dyeing its warp and/or weft threads or by dying it as a whole.

It is preferred that the binder threads 14,114,214, 314 of each fabric blind 1,101,201,301,401 be about 1–3 cm apart, especially about 1–2 cm apart. It is also preferred that the pulling thread loops 442 for each pulling thread 440 of the fabric blind 401 of FIG. 8 also be preferably spaced about 5–15 cm vertically apart and that a plurality of the pulling threads 440 be spaced about 5–15 cm horizontally apart on the fabric blind 401.

The warp and weft threads and the binder threads and their interwoven positions should be selected to ensure that the layers 2,102, 202, 302, 402, 4, 104, 204, 304, 404 of each fabric blind 1, 101, 201, 301, 401 are sufficiently smooth, strong and durable and that the front layer 2, 102, 202, 302, 402 can slide vertically, relative to the rear layer 4, 104, 204, 304, 404, along the binder threads. This is particularly important where the opaque stripes 6, 106, 206, 10, 110, 210 of the layers are relatively densely woven. The use of specific threads in the warp and weft directions is not critical, and conventional mono-filament and multi-filament threads for making window coverings can be used.

However, the binder threads and pulling threads 14,114, 214,314,440 of the fabric blinds 1,101,201,301,401 should be of a strong material, such as polyester, nylon, aramid (e.g., a Nomex or Kevlar aramid), and/or polytetrafluoroethylene (e.g.,Teflon) fibers. The binder threads and pulling threads should also have a smooth exterior surface, especially a surface like that of some mono-filament threads, so as to reduce the friction of the sliding of the front and rear layers 2,102,202, 302,402,4,104,204,304,404 along the binder and pulling threads when opening or closing the fabric blinds. It is preferred that the binder threads are multi-filament threads and that the pulling threads are mono-filament threads. It is also preferred that the binder and pulling threads, as well as the warp and other weft threads, be heat resistant or previously heat-treated, so that any subsequent heat treatment of the fabric blinds, such as transfer printing, does not damage or shrink significantly such threads. In this regard, the binder and pulling threads can have substantially the same heat-shrinkage characteristics as the other weft fibers of the fabric blind, so that the binder threads shrink to about the same extent as the other weft fibers when the fabric blind is heat-treated. It is also preferred that the whole blind be fire resistant, for example by weaving it entirely from TREVIRA CS polyester threads.

It is especially preferred that each binder and pulling thread 14,114,214,314,440 of the fabrics 1,101,201,301,401 is a preshrunk and smooth (not texturized) thread, such as a polyester thread. This is particularly so where the front and rear layers 2,102,202,302,402,4,104,204,304,404 of the fabric blind are not preshrunk, quite particularly where the blind is eventually subjected to heat (e,g., at 195–205 C.) shrinkage, for example during its transfer printing. Thereby, when the fabric blind 1,101,201,301,401 eventually shrinks during heating, the binder and pulling threads 14,114,214, 314 become looser within the blind than they were after the blind had been woven.

It is further preferred that the pulling threads 440 of the fabric blind 401 of FIG. 8 have sufficient strength to lift repeatedly a bottom rail (not shown) of the blind. In this regard, each pulling thread 440 should have a tensile strength of at least 1000 g and an elongation of less than 12% at 500 g. It is especially preferred that each pulling thread 440 is a preshrunk and smooth (not texturized) thread, especially a mono-filament thread, such as a polyester. This is particularly so where the layers 402, 404 of the fabric blind 401 are not preshrunk, especially where the blind is eventually subjected to heat (e.g., at 195–205 C.) shrinkage, for example during its transfer printing. Thereby, when fabric blind 401 eventually shrinks during heating, the pulling threads 440 become looser within the blind than they were after the blind had been woven.

The fabric blinds 1,101,201,301,401 can be installed in an architectural opening, such a window. Conventional mechanisms can then be attached to the top and or bottom of the blinds for sliding their front layers 2,102,202, 302,402 vertically relative to their rear layers 4,104,204, 304,404. Such blinds can also be produced as fixed blinds, roman shades or roller blinds.

This invention is, of course, not limited to the above-described embodiments which can be modified without departing from the scope of the invention or sacrificing all of its advantages. In this regard, the terms in the foregoing description and the following claims, such as “lateral”, “longitudinal”, “front”, “rear”, “horizontal”, “vertical”, “bottom”, “top”, “adjacent”, “parallel”, “length”, “width” and “height”, have been used only as relative terms to describe the relationships of the various elements of the architectural covering of the invention.

For example, the complementary patterns of the layers of the covering could comprise two or more portions of different colors instead of opaque and translucent portions, whereby the two layers could be moved relative to one another to vary the color of the light passing through different portions of the covering. In this regard, the term “complementary” is intended to mean that portions of the layers of the covering of this invention can be made to wholly or partially overlap one another to a greater or lesser extent by moving one layer relative to, and parallel to, the other and thereby affect differently the light passing through the layers.

Likewise, other fabric-making processes, particularly other weaving processes, could be used for making the fabric coverings 1,101,201, 301,401. Also, the opaque and translucent stripes 6,106,206,8,108,208,10,110, 210,12,112, 212 of such blinds need not be have straight, bottom and top edges but could have instead mating, scalloped or saw-toothed bottom and top edges. Moreover, the stripes could extend vertically, instead of horizontally, and accordingly, the layers could move horizontally relative to one another instead of vertically to open and close the covering. Also, the stripes could be replaced by other patterns, such as round, elliptical or other closed patterns without sides, triangular or other polygonal patterns, etc., provided such patterns on the layers can be moved to change their amount of coincidence (e.g., horizontal alignment in a vertical covering).

Furthermore, other architectural coverings, such as shades for lamps and for decorative lighted wall panels, could be made with the front and rear layers 2,102,202, 302,402, 4,104,204, 304,404 and their binder threads 14,114,214, 314 and pulling threads 440.

Also, such coverings and their layers need not extend vertically but could also be horizontal or at an angle. In addition, the rear layers 4,104,204, 304, 404 of such coverings could be moved vertically relative to their front layers 2,102,202, 302,402 instead of vice-verse, and either the front or rear layer could be moved downwardly, instead of upwardly, relative to the other layer to open the coverings.

Moreover, the front layer 302 of the fabric blind 301 of FIG. 7 could have extra weft threads **322*a* forming weft thread loops (not shown) that form tunnels to the front of, and about, the warp threads 322*a*, about which pass vertically the front binder thread loops 316 of the binder thread 314—instead of having the weft thread loops 330 in the rear layer 304—if the front layer is moved relative to the rear layer along the binder threads 314** in the fabric blind.

Likewise, the front layer 402 of the fabric blind 401 of FIG. 8 could have: i) extra weft threads **322*a* which form pulling threads (not shown) that are in front of the front layer and closely pass vertically about the rear of warp threads of the front layer 402**; and ii) weft thread loops (not shown) passing about the rear of the same warp threads that the pulling threads pass about and also about the warp threads on either side of the same warp threads so as to form tunnel, to the rear of, and about, the same warp threads—instead of having pulling threads that are to the rear of the rear layer—if the front layer is attached to the pulling threads of the blind.

Furthermore, each of the translucent stripes 8, 12, 108, 112, 208, 212 of the fabric blinds of this invention could be woven with at least a few warp threads which are preferably thinner than the warp threads used to weave the blinds' opaque stripes 6,10,106, 110, 206, 210. The warp threads in the translucent stripes could serve to prevent the warp threads in the opaque stripes from moving into the translucent stripes, in use, and could also serve to make the translucent stripes a more effective barrier to insects.

Furthermore, conventional techniques can be used to prevent warp threads 20, 320, 420 in the finished fabric coverings 1, 101, 201, 301, 401 from migrating from their opaque stripes 6, 106, 206, 10, 110, 210 into their translucent stripes 8, 108, 208, 12, 112, 212. For example, the technique can be used of Leno-weaving, in which two or more warp threads are twisted around each other as they are interlaced with the weft threads, thus firmly holding the warp threads and preventing their later movement along the weft threads 22, 322, 422. Another technique would be to use warp and/or weft threads containing a low percentage (e.g., 10% or less) of fibers melting at a lower temperature and subsequently heat-treating the finished fabric coverings. See EP 0 359 436 of Philip Poole. In this regard, a preferred thread is a spun-mixture of 90% TREVIRA CS fibers and 10% of lower melting polyester fibers. Alternatively, the fabric covering could be sprayed with a conventional binder (which could be thermoplastic or even thermosetting) to help hold the warp yarns in place.

What is claimed is:

1. An architectural covering, comprising:

a first fabric layer;

a pulling thread which passes through the first layer to form, along the pulling thread, spaced apart, pulling thread loops about threads of the first layer; an end of the pulling thread being located at a side of the first layer; and the first layer being slidable along the pulling thread, toward the end of the pulling thread when the end of the pulling thread is pulled toward an opposite end of the pulling thread with the side of the first layer;

a second fabric layer that is parallel and adjacent to the first layer and substantially coincident with the first layer; the second layer being capable of movement relative to the first layer in a direction parallel to the first layer; and a binder thread, between the layers, which connects them and extends in the direction of movement of the second layer; the second layer being slidable along the binder thread during the movement of the second layer relative to the first layer;

the first and second layers having complementary patterns.

2. The covering of claim 1 wherein the first layer is woven together with the pulling thread.

3. The covering of claim 2 which comprises a plurality of the pulling threads which are parallel.

4. The covering of claim 3 wherein the plurality of the pulling threads are woven into the rear of a rear layer of the covering.

5. The covering of claim 3 wherein the rear layer, has a plurality of weft threads, each forming a plurality of weft thread loops; each weft thread loop spanning a warp thread, about which a pulling thread loop passes, and also spanning warp threads on either side of said warp thread; each weft thread loop being adjacent to said pulling thread loop.

6. The covering of claim 1 wherein said first layer has a weft thread forming a weft thread loop; the weft thread loop spanning a warp thread, about which a pulling thread loop passes, and being adjacent to said pulling thread loop.

7. The covering of claim 6 wherein the weft thread loop spans a warp thread, about which a pulling thread loop passes, and also spans warp threads on either side of said warp thread.

8. The covering of claim 1 having a plurality of parallel binder threads and wherein each binder thread connects the layers in a repeating pattern.

9. The covering of claim 8 wherein the complementary pattern of each layer comprises opaque portions and translucent portions, whereby the two layers can be moved relative to one another between positions where: i) the opaque portions of the pattern on each layer coincide substantially with the translucent portions of the pattern on the other layer to reduce substantially the passage of light through the covering and ii) the opaque portions of the pattern on each layer coincide with each other and the translucent portions of the pattern on each layer coincide with each other to allow the passage of light through the translucent portions of the covering.

10. The covering of claim 9 wherein the two layers can be moved relative to one another, so that the opaque portions of the pattern on each layer coincide completely with the translucent portions of the pattern on the other layer to reduce substantially the passage of light through the translucent portions of the covering.

11. The covering of claim 9 wherein each pattern comprises alternating parallel opaque stripes and translucent stripes; each binder thread extends substantially perpendicularly to the stripes; and the second layer is capable of movement relative to the first layer, along each binder thread, in a direction substantially perpendicular to the stripes to move the stripes between positions where: i) the opaque stripes coincide at least substantially with the translucent stripes and ii) the opaque stripes coincide with each other and the translucent stripes coincide with each other.

12. The covering of claim 11 wherein the alternating parallel opaque stripes and translucent stripes are rectangular.

13. The covering of claim 12 wherein each binder thread passes through opaque portions of alternatively the first layer and the second layer, thus forming binder thread loops in each layer to connect the layers while also extending in a generally straight line.

14. The covering of claim 11 wherein each binder thread passes through opaque portions of alternatively the first layer and the second layer, thus forming binder thread loops in each layer to connect the layers while also extending in a generally straight line.

15. The covering of claim 1 wherein the pulling thread is a preshrunk and smooth thread.

16. The covering of claim 1 wherein each binder thread and each pulling thread is made of a polyester, nylon, aramid, or polytetrafluoroethylene.

17. The covering of claim 16 wherein each binder thread and each pulling thread is made of heat resistant material.

18. The covering of claim 16 wherein each binder thread and each pulling thread is a preshrunk and smooth thread.

19. The covering of claim 16 wherein each binder thread is a multi-filament thread and each pulling thread is a mono-filament thread.

20. The covering of claim 1 wherein the layers are woven together with the binder thread.

21. The covering of claim 8 wherein the layers are woven together with each binder thread and each pulling thread.

* * * * *